United States Patent [19]

Morse et al.

[11] 4,048,887
[45] Sept. 20, 1977

[54] MACHINE FOR TRIMMING THE EDGES OF PANELS

[75] Inventors: Donald B. Morse; Bernard A. Pribish, both of Joliet, Ill.

[73] Assignee: Kemlite Corporation, Joliet, Ill.

[21] Appl. No.: 699,954

[22] Filed: June 25, 1976

Related U.S. Application Data

[62] Division of Ser. No. 599,335, July 28, 1975, Pat. No. 3,990,335, which is a division of Ser. No. 404,105, Oct. 5, 1973, Pat. No. 3,922,940.

[51] Int. Cl.² .......................... B26D 7/06; B27B 5/04
[52] U.S. Cl. ........................................... 83/79; 83/110; 83/404.2; 83/422
[58] Field of Search .................... 83/404.2, 110, 422, 83/79

[56] References Cited

U.S. PATENT DOCUMENTS

| 254,202 | 2/1882 | Euston | 83/404.2 |
| 2,759,504 | 8/1956 | Stooks | 83/404.2 X |
| 3,063,480 | 11/1962 | Mahony et al. | 83/404.2 X |
| 3,769,864 | 11/1973 | Morse et al. | 83/404.2 X |

*Primary Examiner* — Frank T. Yost

[57] ABSTRACT

A machine for trimming the edges of a panel in which the panel is introduced on a table of belts to a pair of spaced saws which trim the side edges of the panel, the panel being then passed through a device which increases its speed and separates it from succeeding panels and onto a rack which when the panel reaches a predetermined position descends to carry the panel to the bed of a carriage where it is clamped in squared position so that when the carriage is moved to carry the clamped panel past a second pair of spaced saws the end edges of the panel are trimmed preferably at an angle of 90° from the sawed side edges of the panel.

7 Claims, 9 Drawing Figures

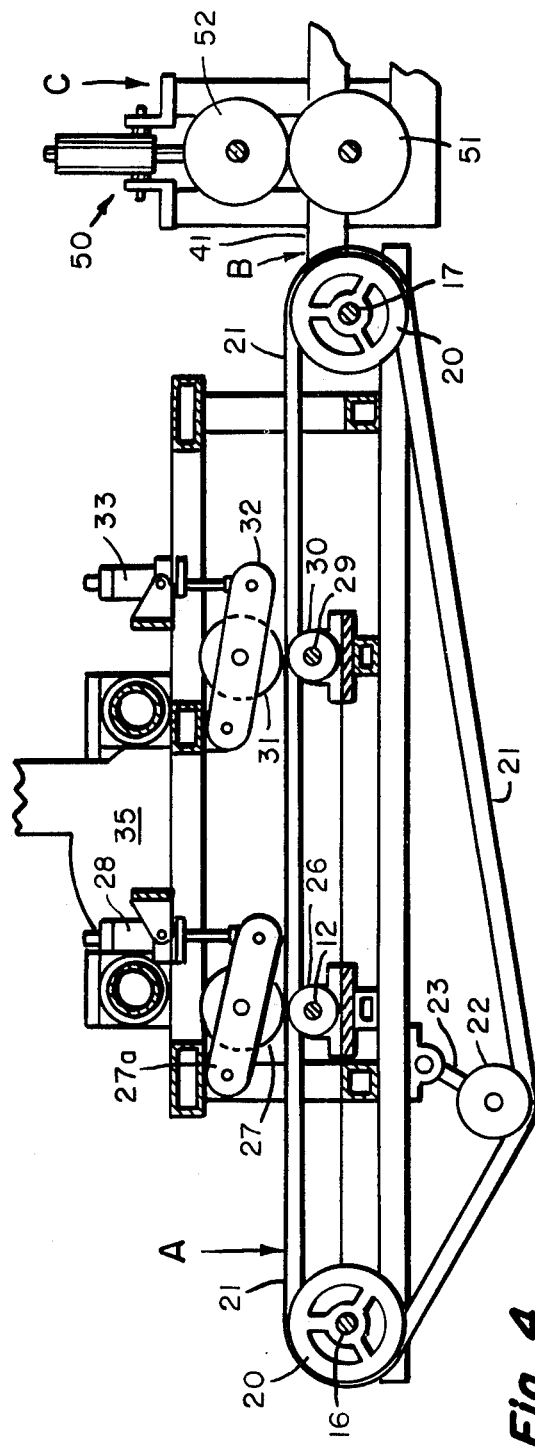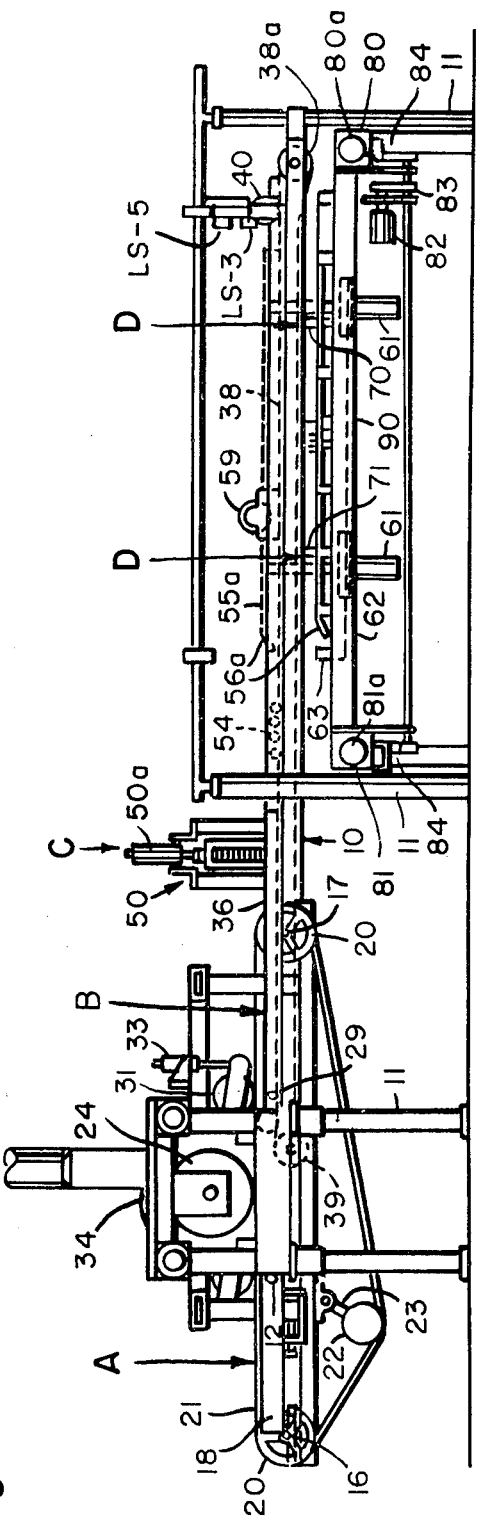

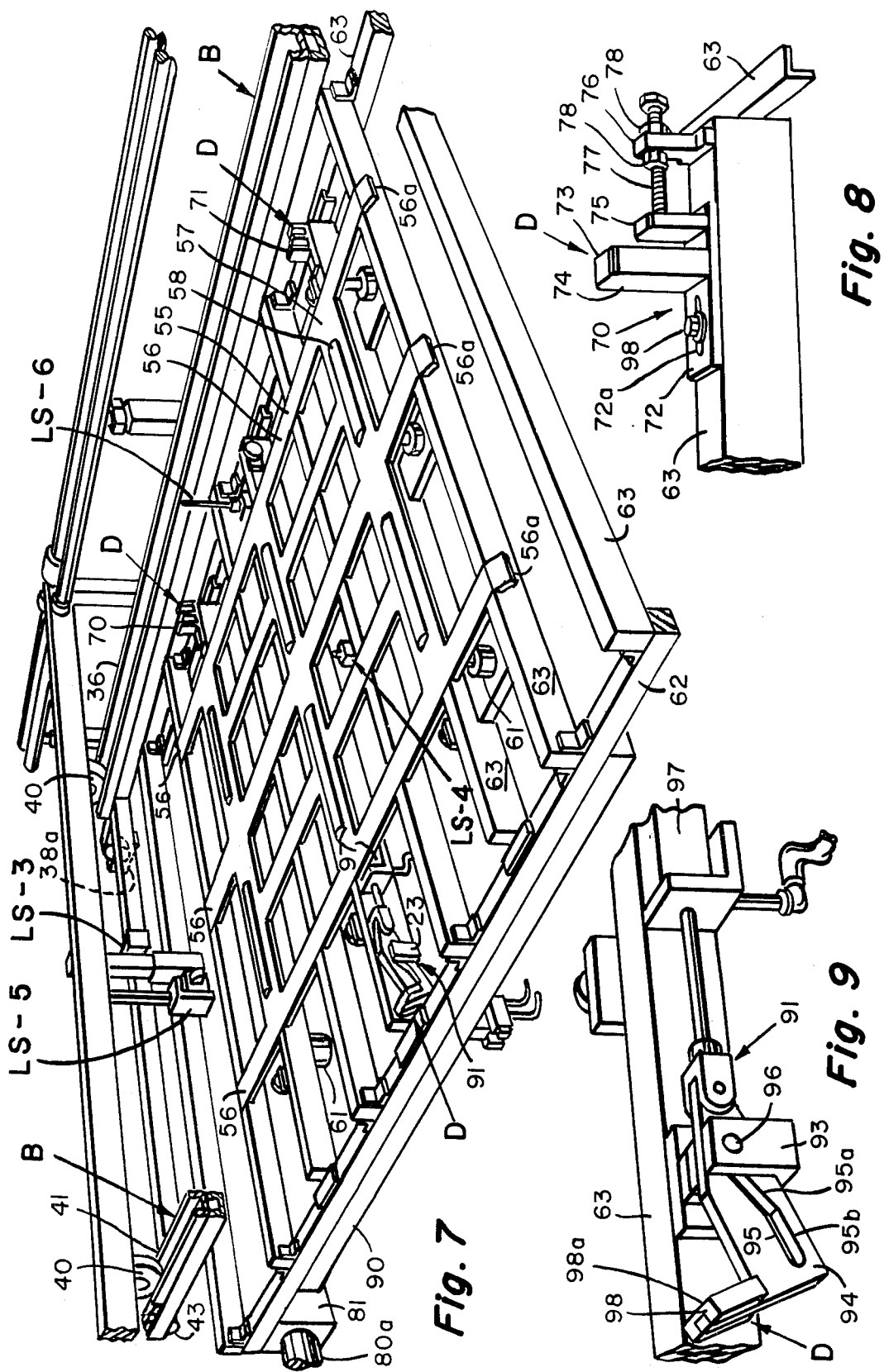

MACHINE FOR TRIMMING THE EDGES OF PANELS

This is a division of application Ser. No. 599,335, filed July 28, 1975, now Pat. No. 3,990,335, which in turn is a division of application Ser. No. 404,105, filed Oct. 5, 1973, now Pat. No. 3,922,940.

This invention relates to a machine for trimming the edges of panels. More particularly, the invention relates to a machine which will receive panels, such as the common 4 × 8 foot plywood panels, continuously, as they come from a forming machine, and trim and square the panels automatically.

The machine is especially adapted for the treatment of panels of plywood or the like which come from the forming machine with their top surfaces coated with a continuous web of material such as resin-impregnated fiberglass. The machine may be utilized for the trimming of panels of many different types, sizes and materials, but for the purposes of the detailed description given herein we will describe the machine as it is applied to panels having a continuous coating of resin-impregnated fiberglass.

BACKGROUND

A most common form of building material is the panel, such as the well known plywood panels which come in many convenient sizes, thicknesses and finishes. One of the problems in the preparation of the panels is to get the edges cut straight and square so that the panels can be used where tolerances are not great and to eliminate hand work when the panels are put in place. It is further desirable to accomplish this automatically at a more rapid rate and without hand labor or human attention.

Machines have heretofore been devised for forming the panels and delivering them continuously, but the edges need trimming, and squaring needs to be done to make the edges true and accurately aligned.

We refer particularly to Menzer U.S. Pat. No. 3,377,228 which describes the formation of a structural panel wherein a fiberglass mat is impregnated with resin in a continuous manner providing a top layer which is placed on the top surfaces of plywood panels which follow one after the other on a conveyor. The composite panels, with the continuous sheet as a top layer, are passed through a heating zone where the resin is cured and the panels are delivered for further finishing.

In the prior practice such further finishing has required skilled hand labor. The resin coating had to be trimmed all about the edges of the panel, and this was slowly and laboriously done by a skilled operator using a knife. In order to have the coating extend to the side edge of the panel it was necessary that the coating extend over the edge somewhat, and this had to be trimmed off as well as to sever the web between the panels. In this trimming operation one slip of the knife many times meant that the panel was ruined. Such hand trimming not only was slow and required a great amount of skill but was a very unpleasant task, and it became very difficult indeed to get men who could and would perform the operation.

By this invention we provide a machine which will perform the necessary functions automatically and which will do the job far more accurately than it possibly could be done by hand and at a much greater rate.

In our copending application Ser. No. 99,135 filed Dec. 17, 1970 we describe a machine of the character above referred to, and in some respects the present application is an improvement on the machine described in our application Ser. No. 99,135. In the improved machine of the present application attention is directed particularly to a machine having improved means for admitting the panels to the machine and for guiding the panels as they pass the first set of saws to trim the side edges of the panel, also improved means for handling the trimmings which result from the trimming the sides of the panel, also improved means for delivering the panels to the carriage for the trimming of the ends, and improved means for bringing the panels into squared position for trimming the ends of the panel.

THE DRAWINGS

One embodiment of the invention is set forth in the accompanying drawings in which FIG. 1 is a top or plan view of the machine;

FIG. 3 is a view of the machine in side elevation, the view being taken from the right hand side, which is from the bottom edge of the sheet containing FIG. 1;

FIG. 4 is a view like FIG. 3 but showing an enlargement of the structure surrounding the first pair of saws;

FIG. 7 is a perspective view of the carriage and rack construction as seen from the upper front end of the machine;

FIG. 8 is a fragmentary perspective view showing one of the stop members for contacting the right hand edge of a panel; and FIG. 9 is a fragmentary perspective view showing the toggle arrangement for clamping the panel at its left side edge.

GENERAL DESCRIPTION

Figure 1:
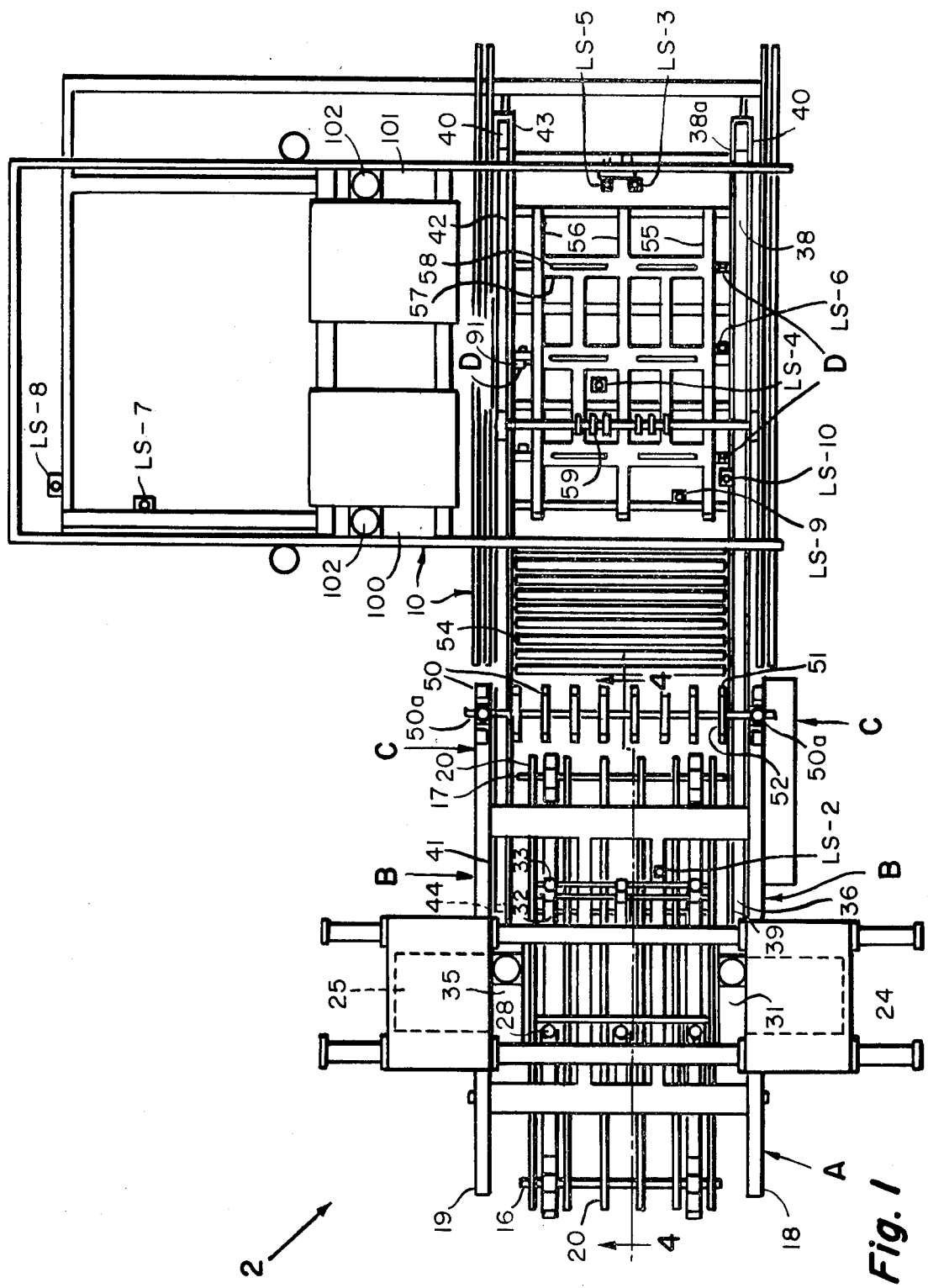

We have now devised a machine which will automatically saw the side edges of panels while conveying the trimmings from the machine, which will convey the panel with its side edges trimmed to a certain position on a carriage, and which will square the panel with certainty on the carriage so that upon operation of the carriage the ends will be trimmed squarely at a 90° angle with the trimmed side edges of the panel.

For convenience of description we may consider the machine as made up of feeding mechanism A by which the panels are fed to the first pair of saws to trim the side edges, mechanism B for handling the trimmings from the trimming of the side edges of the panel, mechanism C for passing the panels to the carriage, and mechanism D for squaring the panels on the carriage for passage to the second set of saws to trim the end edges of the panel.

DETAILED DESCRIPTION

Mechanism A for feeding the panels and guiding them to trim the side edges of the panel includes a pair of shafts 16 and 17 (FIGS. 1 to 4) which have their ends rotatably mounted on longitudinal frame members 18 and 19 of the general frame of the machine. The general frame structure 10 is supported by the posts or legs 11.

Each of shafts 16 and 17 have spaced pulleys 20 and about these pulleys are the belts 21.

As will be seen in FIG. 3, each of the belts 21 is engaged on its return side by a pulley 22. Each of spaced pulleys 22 is mounted on an arm 23 which is pivotally mounted in the frame and spring pressed so as to serve in maintaining the belt tight. The tops of belts 21 are on the same level and in the same plane so that these spaced belts together form a flat support for a panel to rest upon. Each of belts 21 may be made of rubber or other such material having a surface on which the panel would not be likely to slip.

Spaced saws 34 and 35 (FIGS. 1 to 5) are mounted in spaced relation in the frame structure and are driven respectively by motors indicated by characters 24 and 25.

Referring more particularly to FIG. 4, a shaft 12 has its ends rotatably mounted in the frame structure, and has mounted thereon the spaced rolls 26. Directly above each of the spaced rolls 26 is an upper roll 27 which is rotatably mounted on a lever 27a the fore-end of which is pivotally mounted in the frame structure. The other end of each of levers 27a is pivotally attached to the end of a piston of a fluid cylinder 28 which has its body secured suitably to the frame structure.

The tops of rolls 26 are even with the tops of belts 21, and the bottom of rolls 27 ride on the tops of rolls 26 when no panel is in the machine. When a panel is fed to the machine it moves between rolls 26 and 27, with the rolls 27 yielding against fluid pressure of cylinders 28. It will be understood that each of rolls 27 is individually pressed by fluid in the cylinder associated with it.

Rolls 26 and 27 are on the front side of the saws 34 and 35. On the rear side of these saws is the shaft 29 mounted similarly to shaft 12 and carrying rolls 30 similar to rolls 21. Above rolls 30 are rolls 31 pivotally mounted to the central portion of levers 32 each of which has one end pivotally connected to the frame structure and the other end attached to the pistons of cylinders 33. Each of pulleys 20 and shafts 16, 17, 12 and 29 are driven through suitable sprockets and chains or other suitable driving arrangements so that the speed of belts 21 and the peripheral speeds of rolls 26 and 30 will correspond with the speed at which the panel is to pass through the machine.

Figure 6:
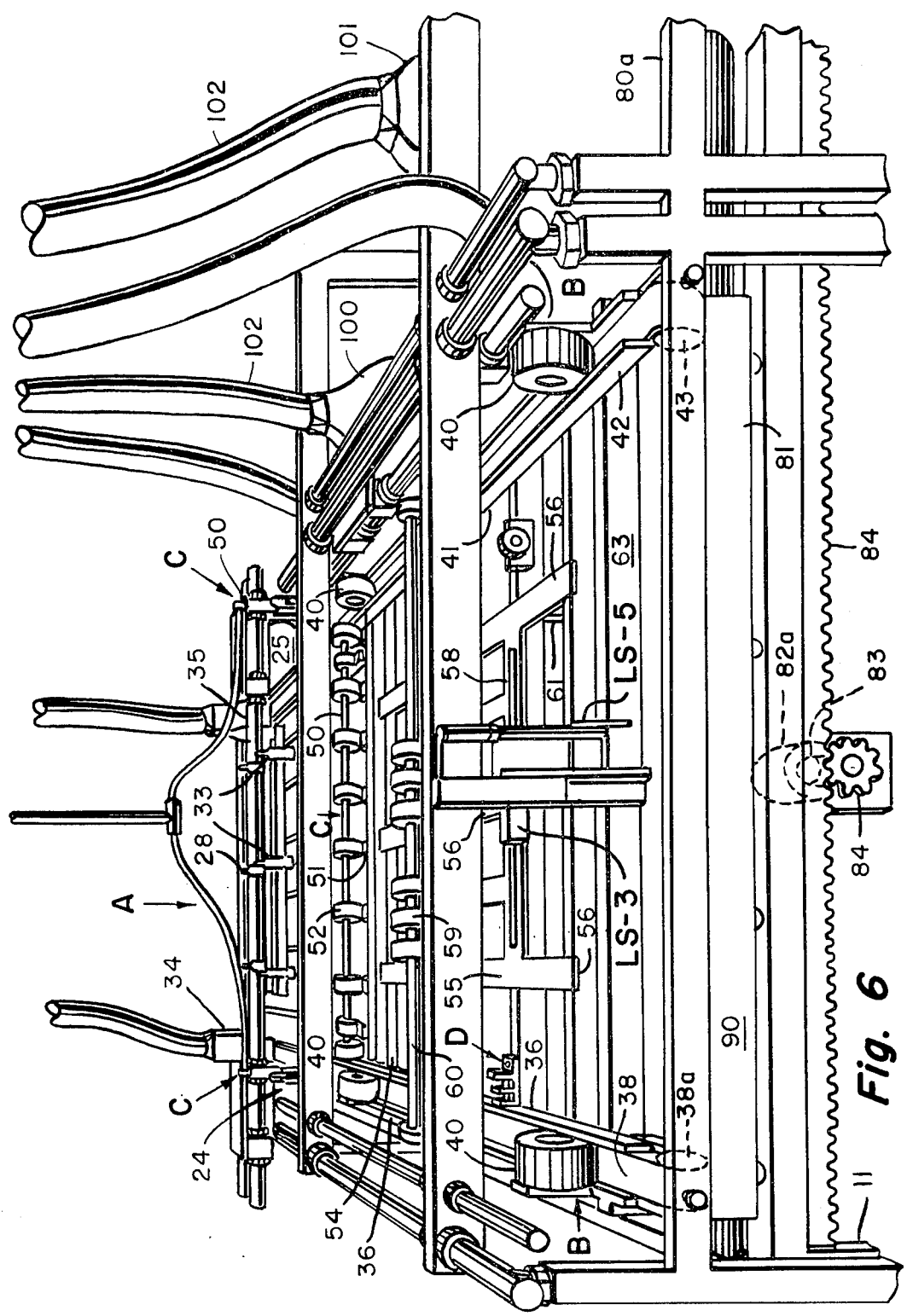
FIG. 6 is a perspective view as seen from a point at the rear end of the machine.

The mechanism B for handling the trimmings which come from the saws 34 and 35 is shown more clearly in FIGS. 3 and 6. Mounted in the frame structure and extending rearwardly at the bottom of saw 34 to the rear of the machine is a channel iron 36. Running in the channel of iron 36 is a belt 38 which may be made of fabric or other suitable material. The belt 38 passes over the pulley 38a at the rear of the machine and then returns to pass over the front pulley 39 and again enter the channel iron 36 at its front end. Resilient rollers 40 are mounted for rotation above the belt 38 in the channel iron 36.

A channel iron 41, similar to channel iron 36, is mounted in the frame structure and extends rearwardly from the saw 35, and a belt 42 similar to belt 37 runs in channel iron 41, extending about pully 43 and returning about front pulley 44 to again enter the channel iron 41.

The mechanism C for delivering the panels after they have been trimmed on their side edges to the carriage (See FIGS. 5, 6 and 7) includes a device 50 for speeding up the passage of a panel after its trailing end edge has passed the saws 34 and 35 and the grip of rolls 30. The panel is sent on by device 50 at a faster rate of speed than the speed at which the following panels are moving so as to separate the forward panel from the others and thus prevent jam-ups while the subsequent operations are taking place. Device 50 includes a lower shaft having the spaced rolls 51, and directly above is a shaft having spaced rolls 52. Rolls 51 and 52 are driven, as by sprockets and chains, at a speed such that their peripheral speeds correspond to the speed at which the panel is driven past the first set of saws 34 and 35. The arrangement is such that the rolls 52 may be pressed upwardly through the action 52a spring 52a to permit a panel to be passed between rolls 51 and 52. Further there is provided a motor and clutch device 53 which is arranged to drive rolls 52 and 53 at a faster rate when the panel passing between rolls 51 and 52 is free to move at such faster rate, that is, when the trailing end edge of the panel has passed the rolls 30. The regular rolls 51 and 52 if of the free wheeling type so that these rolls are normally driven at the regular speed, but when the panel is free to advance are drive by device 50 at an increased speed by reason of the overdrive connection of the motor and clutch device 53.

Fluid cylinders 54 are mounted in the frame and are arranged when activated by fluid pressure to press the shaft of each of rolls 52 downwardly against the tension of spring 52a and against the top of the panel. It is an advantage to have the fluid pressure for this function because the pressure may be completely relieved to permit the panel to enter between rolls 51 and 52 and then activated to urge the panel to move at faster speed. As the forward end of a panel proceeds forwardly of the device 50 it rides over the rolls 54 which have their ends rotatably mounted in the frame structure, and then over the rack 55 (See FIGS. 5 and 6). Rack 55 is formed of 3 members 56 extending longitudinally and three members 56 extending crosswise. The members 56 have downturned ends 56a to guide the forward ends of panels up onto the top surface of the rack. In each of the cross members 57 is mounted a roller 58. The mounting is such that these rollers are free to rotate and have their tops extending slightly above the surface of members 56 and 57. As the fore-ends of the panels move onto the rack they ride on top of rollers 58.

Above the first set of rollers 58 are the upper rolls 59 which are mounted on shaft 60 the ends of which are engaged in bearings in the frame structure and arranged so that the shaft may move upwardly against moderate spring pressure. Thus the rolls 59 cause the panel to lie flat on the rack as they pass onto the rack.

Figure 2:
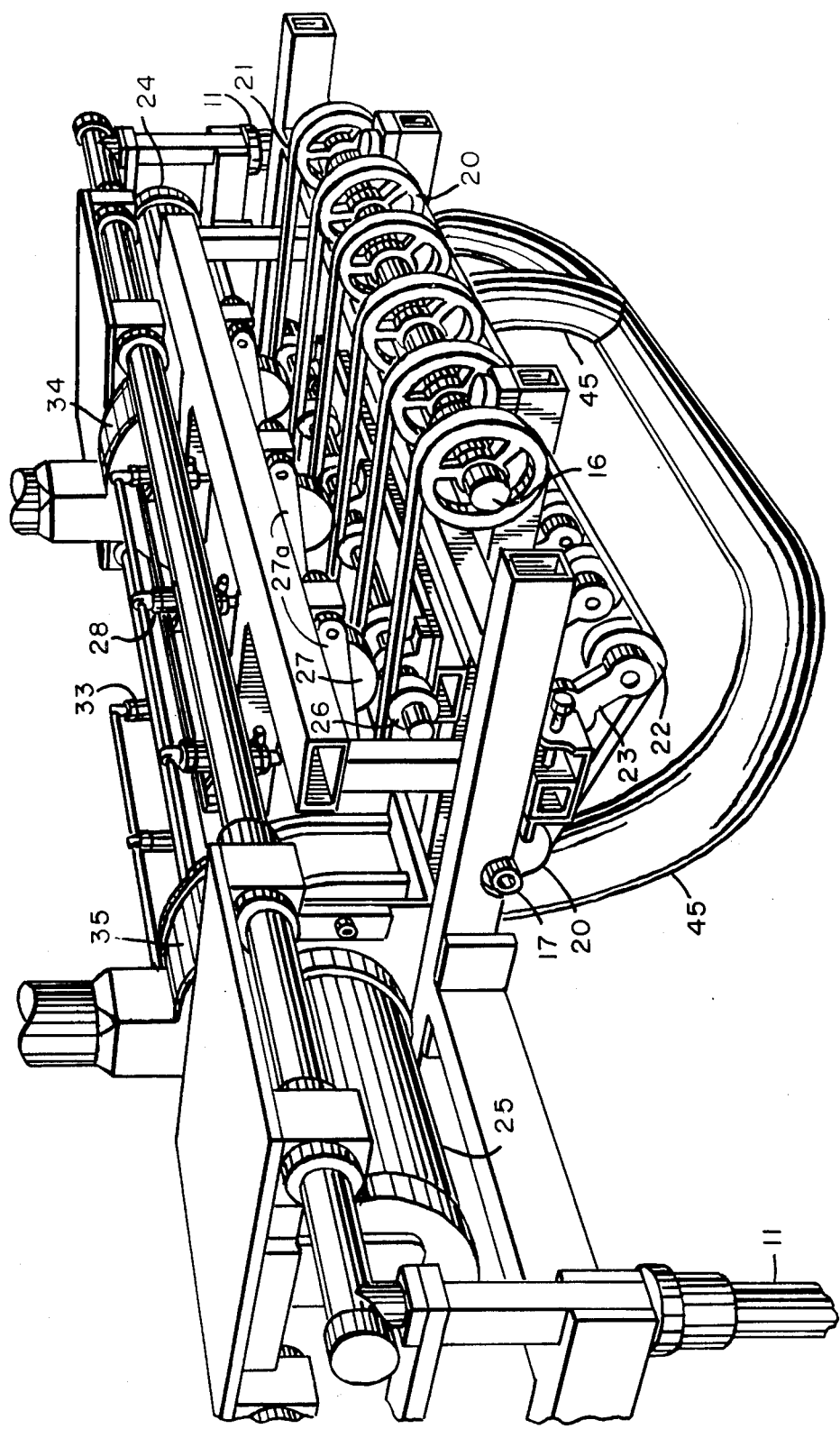
FIG. 2 is a perspective view of the front or intake end of the machine, the view being taken in the direction of the arrow designated 2 in FIG. 1.
Figure 5:
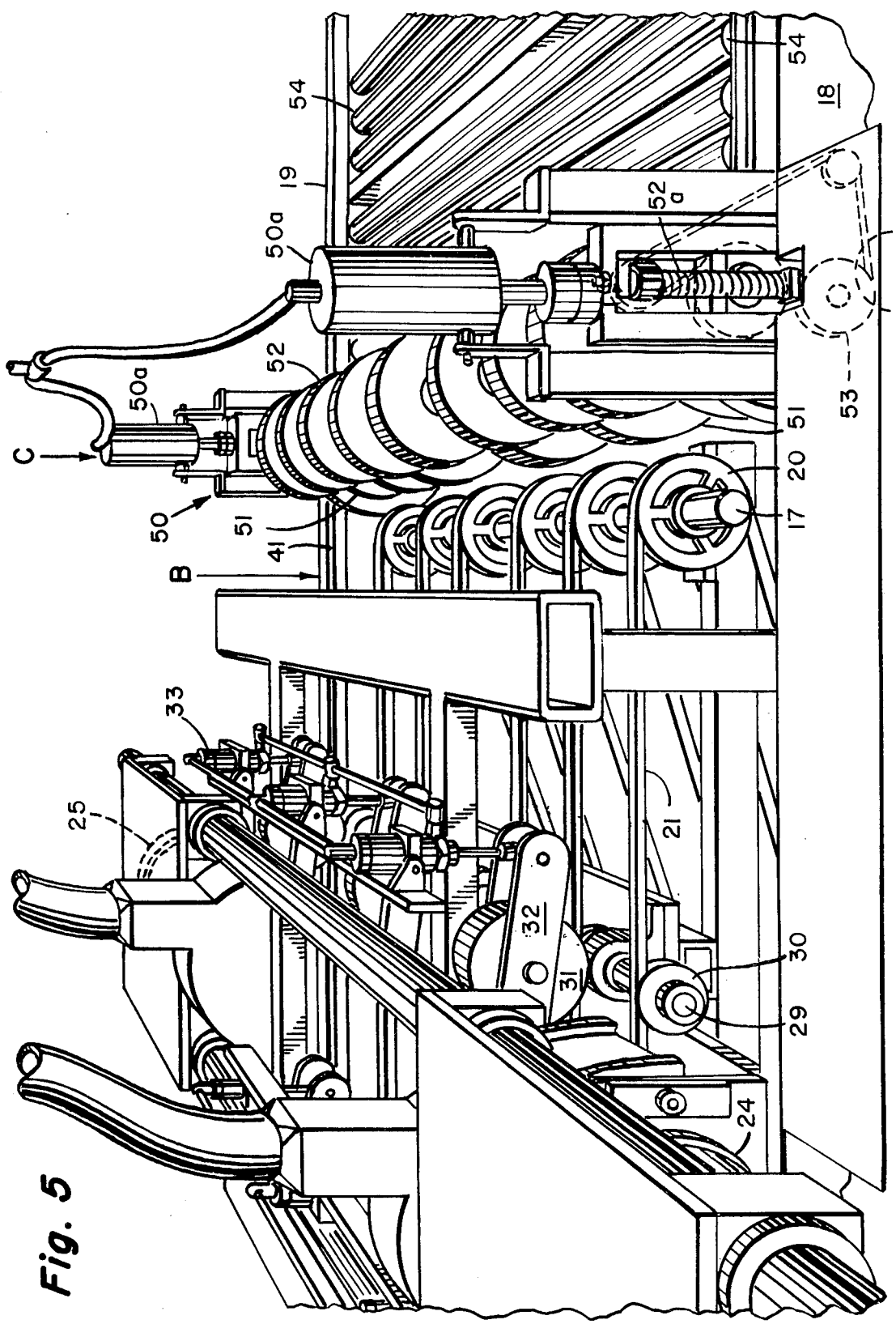
FIG. 5 is a broken perspective view as seen from a point at the right hand side of the machine.

The rack 55 is supported at a level in which its top surface is even with the bottom side of the panel as it comes from device 50. This support is supplied by spaced fluid cylinders 61 at the front end of the rack and also at the rear end of the rack. These cylinders have their bases mounted in the carriage 90 (FIG. 2), and the ends of their pistons attached to the rack. When these cylinders 61 are energized the rack is held in its raised positions 55a, and when fluid is released from cylinders 61 the rack descends until it comes to rest on the bed of the carriage as is shown in FIGS. 2 and 6.

The bed of carriage 90 is formed by the members 62 and the slats 63, which may be of wood or any such suitable material. Suitably the slates 63 may be notched to allow the members 56 and 57 to fit into the notches so that when the grill is in its lowered position the top of the rack is even with the bed of the carriage.

The carriage 90 is mounted in the frame structure by means of a side tube 80 at the foreside of the carriage and a side tube 81 at the rear side of the carriage cylindrical bars 80a and 81a extend through the interior of tubes 80 and 81 respectively and these bars, which extend at right angles with the direction of the panel past saws 34 and 35, have their ends firmly secured in the frame structure, so that through the sliding of the tubes 80 and 81 along bars 80a and 81a the carriage may move back and forth at right angles with the direction in which the panels pass onto the carriage. A motor 82, which desirably is a hydraulic motor, is arranged, when energized to drive the gear 83 along the rack 84 and so move the carriage 90 reciprocally along its path. Rotation of motor 82 in one direction and rotation of this motor in another direction may drive the carriage in the other direction. The engagement of tubes 80 and 81 with bars 80a and 81a serve to keep the carriage steady and aligned as the carriage moves in its reciprocal motion.

The mechanism D for squaring the panels on carriage 90 will now be described. Referring more especially to FIGS. 6, 7 and 8 of the drawings, mounted on the slots of carriage 90 at the right hand side of the panels as they come onto the carriage, is a stop member 70 and another similar stop member 71 spaced from stop 70. Members 70 and 71 are each more clearly illustrated in FIG. 7.

Each of stop members 70 and 71 have a plate 72 having a slot 72a through which a bolt 98 extends to fasten the plate to a slat 63 of the carriage. Fixed to plate 72 an extending upwardly therefrom is the stop piece 73 having a vertical front face 74.

Back of piece 73 and fixed with respect to plate 72 is a stud 75. A second such stud 76 attached to slat 63 has the bolt 77 extending through a tapped opening in stud 76 and has its end engaging the stud 75. With bolt 78 loosened the bolt 77 may be turned to push the face 74 of piece 73 to precisely the desired position, and this position may be secured by tightening bolt 78. It will be understood that the position of the face of stop piece 73 is important to the squaring of the panel, and the arrangement with studs 75 and 76 and bolt 77 provides a vernier adjustment.

As shown in FIG. 6 the two stop members 70 and 71 are spaced a distance apart, the stop 70 being near the fore-end of the panel and the stop 71 being near the rear end of the panel. Each are adjustable as above described.

Attention is now directed to the clamping device 91 shown at the left hand side and rack 55 in FIG. 7 and in detail in FIG. 9. A U-shaped frame piece 93 for the clamping device is secured to a slat 63 and within frame 93 is a clamping arm 94 provided with a slot 95, and a pin 96 which extends across the U-frame 93 and through slot 95. As shown in FIG. 9 slot 95 has a slanted portion 95a and a straight portion 95b.

At its front end arm 94 is pivotally connected to the piston of cylinder 97, the body of cylinder being attached to one of slats 63. At its rear end arm 94 is provided with a jaw member 98 which extends upwardly of the arm. In FIG. 9 clamping device 91 is shown in its relaxed position with pin 96 engaging the fore-end of the slanted slot 95a and the jaw 98 below the top of the slats 63 which is the bed of the carriage. When the cylinder 97 is energized by the introduction of fluid on the rear of the piston the piston is moved forwardly to pull the clamping arm 94 forwardly causing pin 96 to move in the slanted slot section 95a thus bringing the rear end of arm 94 upwardly causing jaw 98 to assume an erect position in which its face 98a is vertical. Further movement of the piston in cylinder 97 moves the arm forwardly causing pin 96 to move to the rear end of the straight portion 95b of the slot. This serves to bring jaw 98 straight forward causing it to engage the left edge of the panel and move the right side edge of a panel tightly against the stop pieces of devices 70 and 71.

As previously stated, the devices 70 and 71 are spaced, one being being nearer the forward end of the panel and the other being nearer the rearward end of the panel. It is important that measured along the direction of movement of the panel onto the rack 55 (or the direction of the side edges of the panel) the clamping device 91 should be located between the devices 70 and 71, suitably at about the center between devices 70 and 71.

When device 91 has been moved into clamping position as above explained both of stops 70 and 71 will be tightly engaging the sawed right side edge of a panel, and when these stops are properly adjusted the sides of the panel will be brought into true longitudinal alignment and precisely square with the direction of travel of the carriage. The panel will be held tightly in this position until the fluid pressure on cylinder 97 is cut off. We have found that the three point clamping arrangement is most precise and enables great accuracy in the squaring of the panels.

While a panel is so clamped the carriage 90 may move from right to left as seen from the right side of FIG. 1 and as it does so it brings a panel past the saws 100 and 101. These saws are mounted in the frame structure and are spaced apart so that each saw cuts of an end edge of a panel which is still engaged in the mechanism D. It is not until these end trimming cuts are made that the fluid in cylinder 92 becomes relaxed and either through spring action or by fluid pressure on the fore side of its piston the panel is released from its clamped condition. Upon movement of the arm to the left (as seen in FIG. 9) the pin 96 travels to the left in slot 95, first backing off in a horizontal direction and when pin 96 engages the slanted portion 95a of the slot 95 the jaw continues to move horizontally but also turns pivotally about the pin so as to move down to a position below the bed of the carriage. This allows the panel to slide along the carriage bed and be removed from the carriage at the far end of the carriage movement.

OPERATION

The overall operation of the machine will now be described in connection with the controls provided for the various function in the proper sequence.

As before mentioned the machine is effectively utilized in connection with materials such as plywood having a coating on one face of resin-impregnated fiberglass. The panels may come, end to end, from a forming machine and have a continuous web of resin-fiberglass extending on their top sides. We will describe the operation as it may take place using such material.

At the start of operation the power is turned on which drives belts 21 and rolls 26, 30 and 51. These are each driven, directly or indirectly from the power source. Both sets of saws, 34-35 and 100-101, are put in operation.

The leading end edge portion of the first panel is introduced to the machine by passing this edge portion of the panel on top the table at the front of the machine provided by the belts 21. The panel rests on this table and does not move with respect to the plane of the top surface of these belts. The leading end edge of the panel passes between rolls 26 and rolls 27. The rolls 26 and 27 are located between the belts 21, and the bottom side of the panel rests also on the rolls 26 and 30. The fluid pressure in each of cylinders 33 causes the rolls 27 to press downwardly individually to press the underside of the panel against the rolls 26 which is just below it so that despite any slight irregularity in the panel each of rolls 26 contacts the panel and is operative in passing the panel onwardly at a uniform rate while holding it at all the points where it passes between a roll 26 and a roll 27 thus preventing the panel from turning or twisting. A similar action takes place at the rolls 30 on the rearward side of saws 34 and 35. Thus the panel is securely held as it moves past the saws 34–35, and this hold is not disturbed even by knots or any irregularities in the panel or its coating.

Sawdust formed through operation of saws 34–35 is removed through the vacuum tubes 45 but the narrow strips which are cut from the side edges of the panel are passed rearwardly in the channels 37, 41, and over belts 38 and 42, are held down by the rolls 48, and finally discharged at the rear end of the machine. These waste strips are fragile and typically about 6 feet or 8 feet in length. They may be easily broken into smaller pieces and hauled away as waste.

The leading edge of the panel passes rearwardly along with belts 21 and at the rearward end of belts 21 enters between rolls 51 and 52. At this point cylinders 50a are not energized and the rolls 52 are in their upper spring-pressed position with an opening between rolls 51 and rolls 52 to receive the leading edge of the panel.

As the first panel proceeds past saws 34–35 at a relatively slow linear rate of speed the trailing end of this panel begins to approach belts 21 followed, suitably by a few inches, by the leading edge of the succeeding panel. At this point an operator standing at the front of the machine may sever the web between the first and second panels, so that the panels may thereafter move independently. This is not a job of skill since there is no need to cut the web exactly at the edges of the panels because the end edges will be trimmed by sawing in the course of operation of the machine in any event.

Reference will now be made especially to FIG. 1 where black squares are used to indicate points at which switches may be located.

In this description no attempt will be made to set forth the exact structure of the switches or precisely how they are mounted in the frame or on the carriage, or the precise character of the valves or control devices which upon activation of the switches perform the functions prescribed, this information being known and available to those skilled in this art. However, the small black squares shown in FIG. 1, and sometimes in the other figures, indicate an approximate location of the switch.

As the trailing edge of the first panel passes over limit switch LS-2 this operates through suitable fluid valve arrangements to pass energizing fluid to cylinders 50a thus pressing rolls 52 downwardly against the top of the panel, to press the panel firmly into contact with rolls 51. Operation of switch LS-2 also starts the motor of device 50, and the leading portion of the panel, which by this time will have entered between rolls 51 and 52 will be impelled by device 50 to move more rapidly. The panel does then take off at a greater speed, separating itself from the succeeding panels and moving quickly over rolls 54 and onto rack 55 which then is in raised position. The panel passes between rolls 59 and the rolls 58 in the rack.

When the trailing edge of the first panel has passed from contact between rolls 51 and 52 the panel moves on its own momentum until its leading edge strikes and operates switch LS-3 which de-energizes the motor of device 50 and cuts off fluid pressure to cylinders 61, permitting the rack with the first panel to drop down to the bed of carriage 90.

When the panel reaches the carriage bed its underside contacts and operates switch LS-4. This switch partially controls the starting of motor 81 to propel the carriage toward the far end of its movement at right angles with the side edges of the panels or in a direction angularly displaced by 90° with the side edges of the panels or with the direction the panels move endwise onto the rack. The connection is such that two other switches as well as switch LS-4 must also be operated in order to start the carriage in motion. One of these is the switch LS-5 at the end edge of the panel. Unless there is some irregularity, both switches LS-4 and LS-5 will be operated through contact with the panel as it moves into position on the bed of the carriage. Another function which is initiated upon operation of switch LS-5 is to turn on fluid pressure to the cylinder 97. This operates, as previously explained, to pull the arm 94 of the clamping device 91 which causes the jaw 98 to raise above the carriage bed and then press the panel into firm contact at its right side edge with the stop members 70 and 71. Pressing of the panel against stop members 70 and 71 also operates the switch LS-6 which together with the already operated switches LS-4 and LS-5 starts motor 82 and puts the carriage in motion.

As the carriage moves toward the far end of its stroke the ends of the panel are brought into contact with the saws 100 and 101 where the end edges are trimmed. The trimmings are passed away through the vacuum tubes 102 while it is being sawed at its end edges the panel remains clamped between the clamping device 91 and the stop members 70 and 71.

After the panel has passed saws 100 and 101 the carriage contacts switch LS-7 mounted in the frame and this operates to reverse the pressure on cylinder 97 to the other side of its piston to cause the clamping device to move to its relaxed position below the bed of the carriage. Operation of switch LS-7 also operates to cut speed of motor 82 and slow the speed of carriage 90. Then when the carriage has reached the end of its stroke, or about so, the carriage contacts switch LS-8 which operates to stop motor 82 and after a time delay start it in the opposite direction to start the carriage on its return movement. The time delay until the carriage starts its return stroke permits attendants to remove the fully squared and trimmed panel from the bed of the carriage.

When the carriage approaches the end of its return travel it contacts switch LS-9 which slows the motor 82 to reduce the speed of the carriage and when the carriage reaches its starting position, or about so, it contacts switch LS-10 which stops the carriage and also energizes cylinders 61 to raise the rack 55 to a position for receiving the following panel thereon.

In the foregoing detailed description the side edges are first trimmed in a direction along the length of the panels, and the edges are latter trimmed along the width of the panels, and it might be presumed that the width always represents the shorter dimension of the panel and the length the longer dimension, but this is not necessarily the case. The machine may obviously be constructed first to trim along the shorter dimension of the panel and later along the longer dimension of the panel. In such case the sides of the panel represent the shorter dimension and the ends of the panel represent the longer dimension in the foregoing description.

It will be understood that although a particular embodiment of the invention has been described in detail herein, many other embodiments may be provided and many changes and alterations may be made in line with the spirit of this disclosure and the skill of the art without departing from this invention.

We claim:

1. A machine for trimming the edges of panels comprising a first pair of spaced saws, means for passing a panel in one direction past said first pair of saws to trim the side edges off said panel, a second pair of spaced saws, a carriage reciprocally movable in a direction angularly displaced from sid one direction, a rack, means for passing the panel to a position on said rack after the panel has been trimmed by said first pair of spaced saws, means for supporting said rack above the bed of said carriage, said supporting means including a fluid cylinder, means sensitive to the arrival of the panel at said position for deactivating said fluid cylinder to permit said rack with a panel thereon to descend to the bed of said carriage, means for holding the panel in fixed position on said carriage, and power means for moving said carriage with said panel thereon past said second pair of saws whereby to trim the end edges of the panel.

2. A machine as set forth in claim 1 in which said means sensitive to said position includes a switch positioned for contact with the leading end edge of the panel as the panel is moved by said panel passing means to said position over said rack.

3. A machine as set forth in claim 1 wherein said angularly displaced is 90° displaced from said one direction.

4. A machine as set forth in claim 1 in which said panel passing means includes a device for speeding up linear movement of the panel toward said position to advance the panel and separate it from successive panels proceeding through the machine.

5. A machine as set forth in claim 1 in which said panel passing means includes a roller mounted in said rack and having its top edge above the level of the rack and an upper roll over said roller and resiliently pressing against the top side of the panel as it proceeds over said rack toward said position to press the panel against said roller in said rack.

6. A machine as set forth in claim 1 including a pair of spaced stops on one side of the panel as it rests on the bed of said carriage, and a clamping device adjacent the other side edge of said panel located longitudinally between said stops and operable to press said other edge of the panel to bring said one side of the panel against each of said tops and thereby clamp the panel in fixed position on said carriage.

7. A machine as set forth in claim 6 including a fluid cylinder which when activated is operable to activate said clamping device.

* * * * *